United States Patent
Lee et al.

(10) Patent No.: US 6,606,190 B2
(45) Date of Patent: Aug. 12, 2003

(54) INHOMOGENEITY TUNABLE ERBIUM-DOPED FIBER AMPLIFIER WITH LONG WAVELENGTH GAIN BAND AND METHOD OF BLOCKING PROPAGATION OF BACKWARD AMPLIFIED SPONTANEOUS LIGHT EMISSION IN THE SAME

(75) Inventors: Jyung Chan Lee, Daejeon (KR); Moo Jung Chu, Daejeon (KR); Kwang Joon Kim, Daejeon (KR); Jong Hyun Lee, Daejeon (KR)

(73) Assignee: Korea Electronics & Telecommunications Research Institute (KR)

( * ) Notice: Subject to any disclaimer, the term of this patent is extended or adjusted under 35 U.S.C. 154(b) by 28 days.

(21) Appl. No.: 09/997,421

(22) Filed: Nov. 28, 2001

(65) Prior Publication Data

US 2002/0063950 A1 May 30, 2002

(30) Foreign Application Priority Data

Nov. 29, 2000 (KR) ........................................ 2000-71463

(51) Int. Cl.[7] .............................................. H04B 10/12
(52) U.S. Cl. ................................ 359/337.1; 359/341.4; 359/337; 359/341.3
(58) Field of Search .......................... 359/341.1, 341.3, 359/341.4, 337, 337.1, 3; 372/6

(56) References Cited

U.S. PATENT DOCUMENTS

| 5,140,456 A | 8/1992 | Huber .......................... 359/341 |
| 5,187,610 A | 2/1993 | Habbab et al. ............. 359/341 |
| 5,430,572 A | 7/1995 | DiGiovanni et al. ........ 359/341 |
| 5,920,424 A | 7/1999 | Espindola et al. .......... 359/341 |

(List continued on next page.)

FOREIGN PATENT DOCUMENTS

EP  1 087 550 A1 * 3/2001

OTHER PUBLICATIONS

Flood, F.A. "Impact of pump and signal wavelength on inhomogeneous characteristics of L–Band EDFAs." OFCC 200, pp. 117 19, vol. 2.*

Yadlowsky, M.J. "Pump Wavelength–Dependent Spectral–Hole Burning in EDFA's." J. Lightwave Tech. 17:9, Sep. 1999, pp. 1643–1648.*

Kean et al. "Pump induced inhomogeneity of gain spectra in conventional and extended–band EDFAs." OFCC 1999 Tech. Digest, Feb. 1999, pp. 10–12, vol. 2.*

(List continued on next page.)

*Primary Examiner*—Thomas G. Black
*Assistant Examiner*—Andrew R. Sommer
(74) *Attorney, Agent, or Firm*—Blakely, Sokoloff, Taylor & Zafman

(57) ABSTRACT

Disclosed herein is an inhomogeneity tunable erbium-doped optical fiber amplifier with a long wavelength band and method of blocking a backward amplified spontaneous light emission in the same. The optical fiber amplifier includes a control device situated between a first amplification stage and a second amplification stage for controlling an isolation rate of a backward amplified spontaneous light emission being propagated from a second amplification stage to the first amplification stage. The method blocks a backward amplified spontaneous light emission in a two-stage inhomogeneity tunable erbium-doped optical fiber amplifier with a long wavelength gain band, in which the backward amplified spontaneous light emission being propagated from a second amplification stage to a first amplification stage is blocked, and an isolation rate of the backward amplified spontaneous light emission is controlled according to the intensity of an optical signal inputted to the first amplification stage.

7 Claims, 7 Drawing Sheets

U.S. PATENT DOCUMENTS

| | | | |
|---|---|---|---|
| 5,995,277 A | | 11/1999 | Kim et al. .................. 359/341 |
| 6,201,637 B1 | * | 3/2001 | Nilsson et al. ......... 359/341.33 |
| 6,222,670 B1 | * | 4/2001 | Ryu et al. ................... 359/345 |
| 6,233,092 B1 | * | 5/2001 | Flood et al. ................ 359/345 |
| 6,252,700 B1 | * | 6/2001 | Hwang et al. .............. 359/337 |
| 6,288,834 B1 | * | 9/2001 | Sugaya et al. ........... 359/341.1 |
| 6,339,495 B1 | * | 1/2002 | Cowle et al. ............ 359/341.4 |
| 6,356,385 B1 | * | 3/2002 | Digonnet et al. ........... 359/337 |
| 6,421,172 B1 | * | 7/2002 | Flood et al. ........... 359/341.41 |
| 6,437,906 B1 | * | 8/2002 | Di Pasquale et al. .... 359/337.2 |
| 6,501,594 B1 | * | 12/2002 | Hwang et al. ......... 359/341.32 |
| 2002/0141043 A1 | * | 10/2002 | Flood ......................... 359/337 |

OTHER PUBLICATIONS

Yadlowsky et al. "Pump–mediated inhomogeneous effects in EDFAs and their impact on gain spectral modeling." OFC 1998 Tech. Digest, pp. 35–36.*

Desurvire et al. "Study of Spectral Dependence of Gain Saturation and Effect of Inhomogeneous Broadening in Erbium–Doped Aluminosilicate Fiber Amplifiers." Photonics TEch. Lett. 2:9, Sep. 1990, pp. 653–655.*

Hansen et al. "L–Band Erbium–Doped Fiber amplifiers— Theory and Design" Master's Thesis, Jan. 31, 2001.*

1.58 u.m. band fluoride–based Er doped fibre amplifier for WDM transmission systems; H. Ono; Electronics Letters Aug. 14, 1997; vol. 33, No. 17 p. 1471–1472.

High Gain, broadband, 1.6 um Er doped silica fibre amplifier; Massicoh et al. Elect. Lett, 26:20, Sep. 1990; pp 1645–1646.

Low Noise operation of Er doped silica fibre amplifier around 1.6 um; Electronics Letters Sep. 24, 1992; vol. 28, No. 20 p. 1924–1925.

Low noise and high gain 1.58 um band Er doped fibre amplifiers with cascade configurations; Electronics Letters Aug. 14, 1997 vol. 33 No. 17 p. 1477–1479.

Comparison of amplification characteristics of 1.58 and 1.55 um band EDFAs Electronics Letters Jul. 23, 1998 vol. 33 No. 15 p. 1509–1510.

Enhancement of power conversion efficiency for an L–band EDFA with a secondary pumping effect in the unpumped EDF Section; IEEE Photonics Technology Letters vol. 11, No. 1 Jan. 1999.

Ultra Low Noise Long Wavelength EDFA With 3.6dB External Noise Figure; K J Cordina et al.; W A5–1/13 (No Date).

* cited by examiner

INHOMOGENEITY TUNABLE ERBIUM-DOPED FIBER AMPLIFIER WITH LONG WAVELENGTH GAIN BAND AND METHOD OF BLOCKING PROPAGATION OF BACKWARD AMPLIFIED SPONTANEOUS LIGHT EMISSION IN THE SAME

BACKGROUND OF THE INVENTION

1. Field of the Invention

The present invention relates to an inhomogeneity tunable erbium-doped fiber amplifier with a long wavelength gain band and method of blocking the propagation of a backward amplified spontaneous light emission in the same, and more particularly to an inhomogeneity tunable erbium-doped fiber amplifier with a long wavelength gain band and method of blocking the propagation of a backward amplified spontaneous light emission in the amplifier, which is capable of amplifying optical signals of a 1565 to 1605 nm wavelength band transmitted from a transmission line of a WDM (Wavelength Division Multiplexing) fiber transmission system, and tuning backward amplified spontaneous light emissions, thereby improving its output characteristics, such as gain inhomogeneity and a noise figure.

2. Description of the Prior Art

In order to obtain a long wavelength gain band using erbium-doped optical fiber for C-band (Conventional band) whose gain characteristic is optimized at a 1520 to 1560 nm wavelength, 80 m or more of optical fiber should be utilized. However, in this case, there occur problems that the in/out power conversion efficiency of a long wavelength band is decreased to 35% or less, and a noise figure is increased due to low population inversion.

In addition, when an optical amplifier with a long wavelength gain band is designed to amplify multi-wavelength optical signals at a long wavelength band at the same time, the gain spectrum of the erbium-doped fiber cannot be kept the same with regard to the wavelengths of multi-wavelength optical signals, and gain distortion with regard to the wavelengths of optical signals occurs due to the inhomogeneity characteristics of the erbium-doped optical fiber.

In order to overcome the above problems, D. J. DiGiovanni proposed a two-stage optical amplifier with a long wavelength band. This optical amplifier with a long wavelength band, as shown FIG. 1, is comprised of a first stage of a forward stimulation structure using a 980 nm stimulation laser diode, and a second stage of a backward stimulation structure using a 1480 nm stimulation laser diode (see U.S. Pat. No. 5,430,572, filed on Jul. 4, 1995). An optical isolator is positioned between the first stage and the second stage so as to completely block (or isolate) backward amplified spontaneous light emissions that is generated at the second stage and is being propagated to the first stage. The first amplification stage performs amplification using a comparatively short length of an erbium-doped optical fiber, and the second amplification stage performs additional amplification.

An optical amplifier suggested by H. Ono et al. in "Journal of Lightwave Technology, vol. 17", as shown in FIG. 1, has a two-stage amplification arrangement of a hybrid type. The first amplification stage is stimulated using a 980 nm wavelength laser diode, and the second amplification stage is stimulated using a 1480 nm wavelength laser diode. At the first amplification stage, a short length of erbium-doped optical fiber is stimulated by the 980 nm wavelength laser diode so as to decrease a noise figure, while at the second amplification stage, a longer length of erbium-doped optical fiber is stimulated by the 1480 nm wavelength laser diode so as to increase efficiency.

With reference to FIG. 1, a conventional erbium-doped optical fiber amplifier with a long wavelength gain band is described in detail. This conventional amplifier comprises a first stage of a forward stimulation structure using the 980 nm stimulation laser diode 106 for the generation of stimulation light and a second stage of a backward stimulation structure using the 1480 nm stimulation laser diode 108 for the generation of stimulation light. An input optical signal 101 generated at the first stage and stimulation light emitted from the 980 nm laser diode 106 are coupled to each other through a light-isolation type wavelength multiplex optical coupler (IWDM coupler) 105 having a function of isolating light. In order to separate an optical signal output 104 and stimulation light emitted from the 1480 nm laser diode 108 at the second stage and to block backward optical signals being propagated from an output end to the second stage, a wavelength multiplex optical coupler (IWDM coupler) 109 having a function of isolating light is also employed. In this case, the wavelength multiplex optical coupler 109 of the second stage has an insertion loss of 0.3 dB, thereby limiting the increase of a noise figure due to an insertion loss resulting from a front insertion of the wavelength multiplex optical coupler 105 at the first stage.

The optical isolator 107 positioned between the first amplification stage and the second amplification stage blocks a backward amplified spontaneous light emission, which is generated at the second stage and is being propagated to the first stage. That is, the optical isolator 107 allows light being propagated from an output point 102 of the first stage to an input point 103 of the second stage to pass therethrough, and blocks light being propagated from the input point 103 of the second stage to the output point 102 of the first stage. An erbium-doped optical fiber 110 having a cut-off wavelength of 895 nm, which is effective for 980 nm stimulation light, is employed as a gain medium at the first amplification stage. Additionally, an erbium-doped optical fiber 111, which has a cut-off wavelength of 1310 nm and an erbium-doped density of 1000 ppm, is effective for the 1480 nm stimulation light and has high in/output conversion efficiency of 38 to 50% at a long wavelength band, is employed as a gain medium at the second amplification stage.

The 980 nm stimulation light is completely absorbed into the erbium-doped optical fiber 110 at the first amplification stage, so the stimulation light does not exist at the output end 102 of the first stage. The backward amplified spontaneous light emission generated from the second amplification stage should includes a 90% backward amplified spontaneous light emission of a 1560 to 1600 nm band in order that a ratio of 1560 to 1600 band intensity and 1520 to 1560 nm band intensity of the emission is 90:10.

In the optical amplifier with a long wavelength gain band shown in FIG. 1, the spontaneous light emission backwardly propagated from the second amplification stage to the first stage is blocked by the optical isolator 107, so the noise figure and inhomogeneity characteristics of the optical amplifier with a long wavelength gain band are improved and high power output and high efficiency are achieved.

FIGS. 2 to 5 are graphs showing the variations of characteristics in the cases where the backward amplified spontaneous light emission is blocked by the optical isolator in the two-stage optical amplifier with a long wavelength gain band constructed as shown in FIG. 1, and it is not blocked. FIG. 2 is a graph showing in/out power conversion efficiency according to an input light signal. A solid line in FIG. 2 represents the case where the backward-propagating spontaneous light emission is blocked, and a dotted line in FIG. 2 represents the case where the backward-propagating spontaneous light emission is not blocked.

Referring to FIG. 2, when the intensity of an optical signal input is low, the in/out power conversion efficiency is increased in the case where the backward amplified spontaneous emission is blocked; whereas when the intensity of an optical signal input is increased, in/out power conversion efficiency is gradually decreased in the case where the backward amplified spontaneous light emission is blocked, and the efficiency is gradually increased in the case where the backward amplified spontaneous light emission is unblocked. When the backward amplified spontaneous emission is blocked, it has a problem that the in/out power conversion efficiency is lower as the intensity of optical signal input is higher.

FIG. 3 is a graph showing the variation of a noise figure according to an input light signal. A solid line in the FIG. 3 represents the case where the backward amplified spontaneous light emission is blocked, and a dotted line represents the case where the backward amplified spontaneous light emission is not blocked.

Referring to FIG. 3, when the intensity of an optical signal input is low, a noise figure is very low in the case where the backward amplified spontaneous light emission is blocked; whereas when the intensity of optical signal input is increased, a noise figure becomes high. In contrast to the above case, when the intensity of optical signal input is low, a noise figure is very high in the case where the backward amplified spontaneous light emission is unblocked; whereas when the intensity of optical signal input is increased, the noise figure becomes considerably lower. As described above, when the backward amplified spontaneous light emission is blocked, there occurs a problem that a noise figure characteristic is deteriorated as the intensity of input optical signal becomes high.

FIG. 4 is a graph showing the changing characteristics of forward propagating spontaneous emission enhancement of the optical amplifier according to the stimulation light intensity of the 1480 nm stimulation laser diode connected to the second stage. Referring to the FIG. 4, gain balance can be tuned by the backward amplified stimulation light intensity, and an isolation rate or a blocking rate of the backward amplified spontaneous light emission can be also tuned, thereby improving gain and controlling gain imbalance.

FIG. 5 shows the changing characteristics of a gain spectrum in the case where a wavelength of an input optical signal is changed to about 1576 nm and 1596 nm on the basis of a gain spectrum obtained for the input optical signal located near 1586 nm when the backward amplified spontaneous light emission is blocked by the optical isolator 107 in the optical amplifier with a long wavelength gain band shown in FIG. 1. Referring to FIG. 5, it can be understood that a difference of a total gain spectrum according to the wavelength change of the input optical signal is uniform when the backward amplified spontaneous light emission is blocked.

As described above, the two-stage optical amplifier with a long wavelength gain band has an advantageous structure that is capable of improving the in/out power conversion efficiency and a noise figure, and of solving inhomogeneity characteristics. However, it has problems that the in/out power conversion efficiency and a noise figure are deteriorated when the intensity of input optical signal is increased.

SUMMARY OF THE INVENTION

Accordingly, the present invention has been made keeping in mind the above problems occurring in the prior art, and an object of the present invention is to provide an inhomogeneity tunable erbium-doped fiber amplifier with a long wavelength gain band and method of blocking the propagation of a backward amplified spontaneous light emission in the amplifier, in which in two-stage erbium-doped optical fiber amplifier with a long wavelength gain band, the isolation rate of a backward amplified spontaneous light emission generated at a second amplification stage is turned according to intensity of an optical signal inputted into a first amplification stage, thereby improving in/out power conversion efficiency and a noise figure.

In order to accomplish the above object, the present invention provides an inhomogeneity tunable erbium-doped optical fiber amplifier with a long wavelength band, comprising a control device situated between a first amplification stage and a second amplification stage for controlling an isolation rate of a backward amplified spontaneous light emission being propagated from a second amplification stage to the first amplification stage.

Preferably, the control device includes two three-port optical circulators situated between the first amplification stage and the second amplification stage and serially connected to each other, and an optical attenuator for connecting the other ports of the two optical circulators, wherein a forward propagating optical signal is propagated from the first amplification stage through the two optical circulators to the second amplification stage, and the backward amplified spontaneous light emission is propagated from the second amplification stage to the first amplification stage through one of the optical circulators, the optical attenuator and the other optical circulator, so the forward propagating optical signal is propagated without attenuation and the backward amplified spontaneous emission is attenuated by the optical attenuator.

In addition, the present invention provides a method of blocking a backward amplified spontaneous light emission in a two-stage inhomogeneity tunable erbium-doped optical fiber amplifier with a long wavelength gain band, which blocks the backward amplified spontaneous light emission being propagated from a second amplification stage to a first amplification stage, wherein an isolation rate of the backward amplified spontaneous light emission is controlled according to the intensity of an optical signal inputted to the first amplification stage.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, an erbium-doped optical fiber amplifier with a long wavelength gain band and method of blocking a backward amplified spontaneous light emission in the same according to an embodiment of the present invention is described in detail with reference to the appended drawings.

Figure 1:
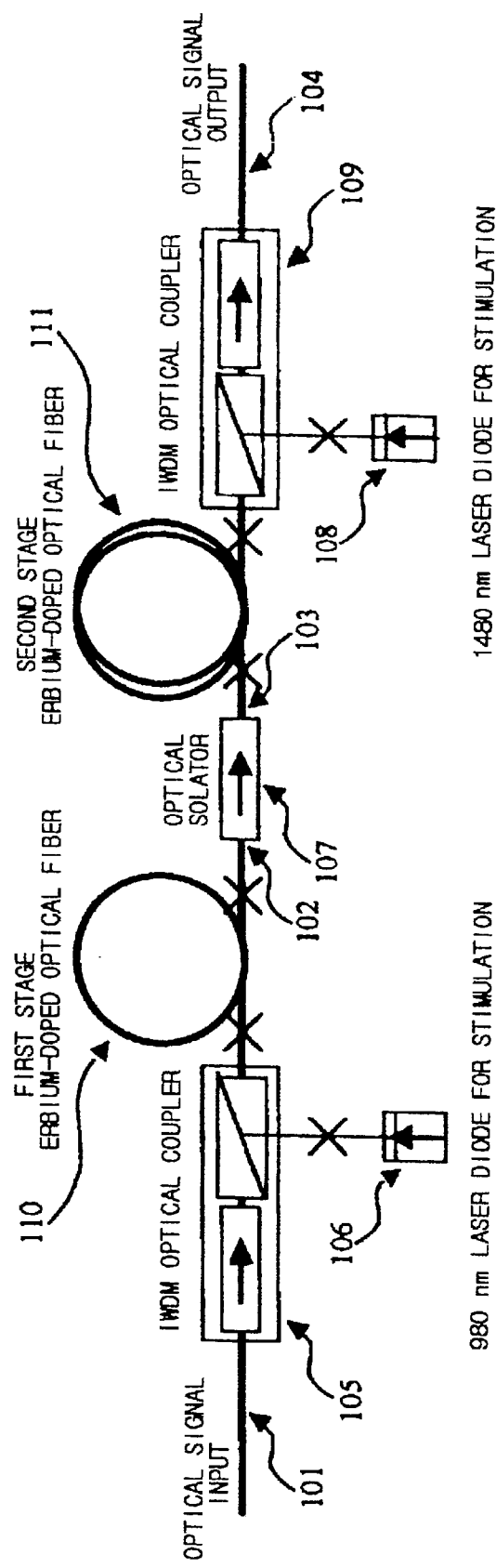
FIG. 1 is a view showing an arrangement of a conventional two-stage erbium-doped optical fiber amplifier with a long wavelength gain band.
Figure 2:
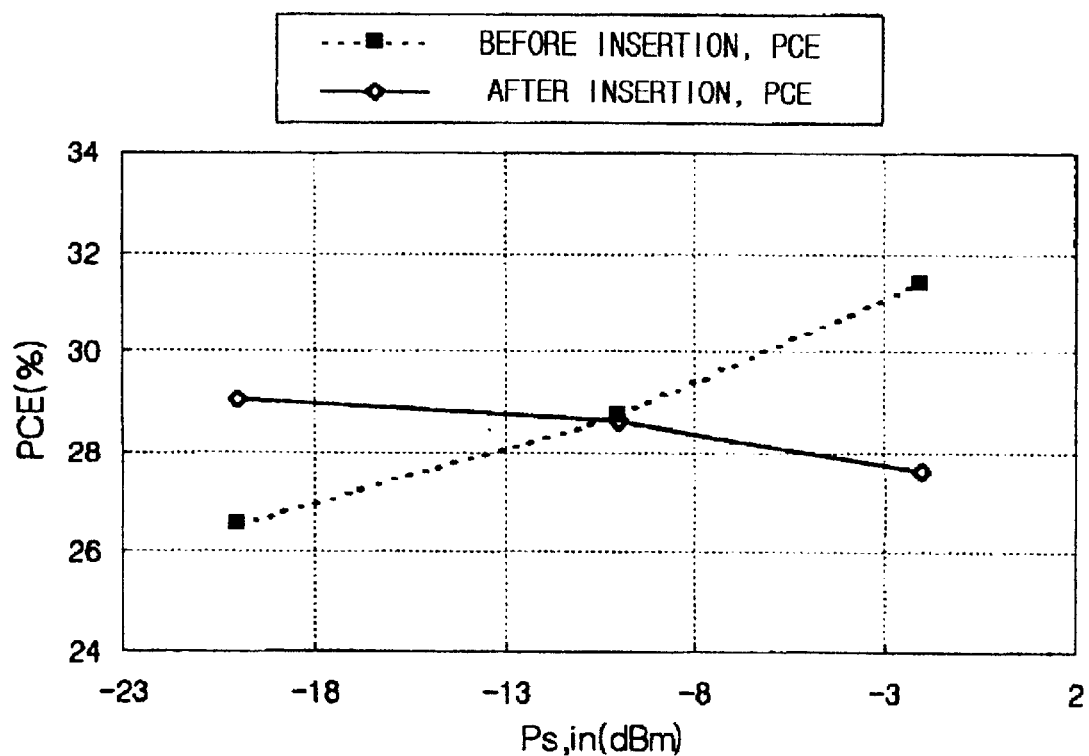
FIG. 2 is a graph showing in/out power conversion efficiency according to the intensity of an input light signal in the cases where an optical isolator is inserted into the front of the second stage of FIG. 1 or not.
Figure 3:
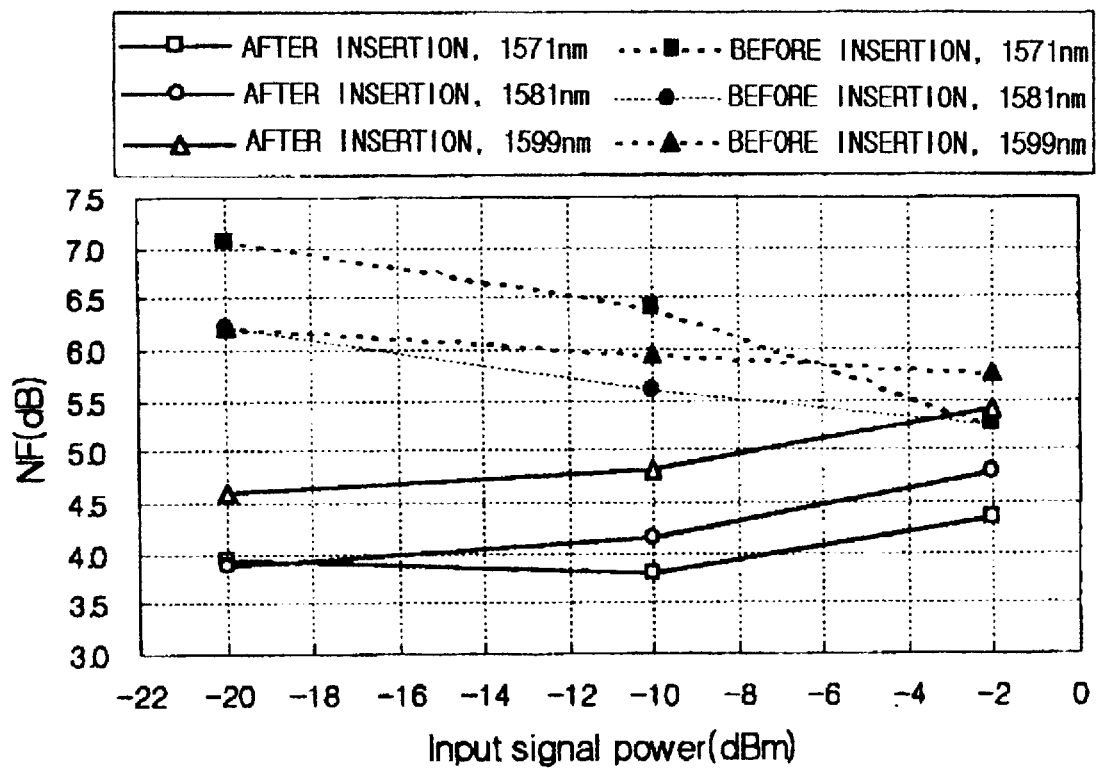
FIG. 3 is a graph showing noise figure characteristic according to an input light signal in the cases where an optical isolator is inserted into the front of the second stage of FIG. 1 or not.
Figure 4:
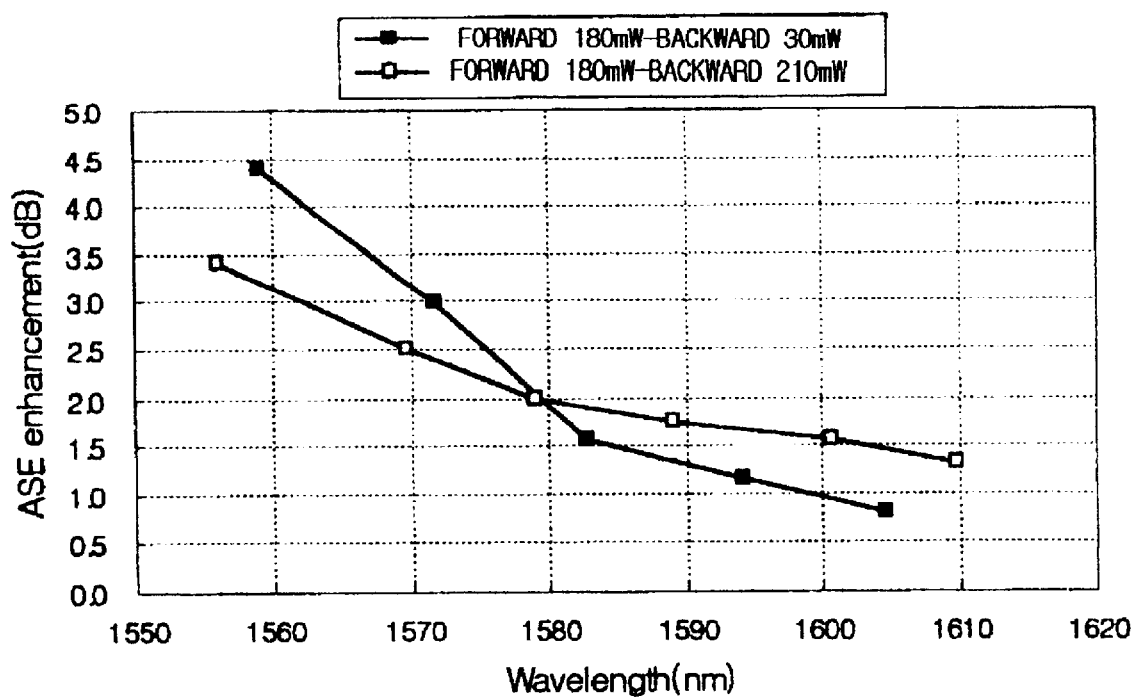
FIG. 4 is a graph showing the improvement of the intensity of a spontaneous light emission according to the intensity of backward amplified stimulation when the optical isolator is inserted into the front of the second stage of FIG. 1.
Figure 5:
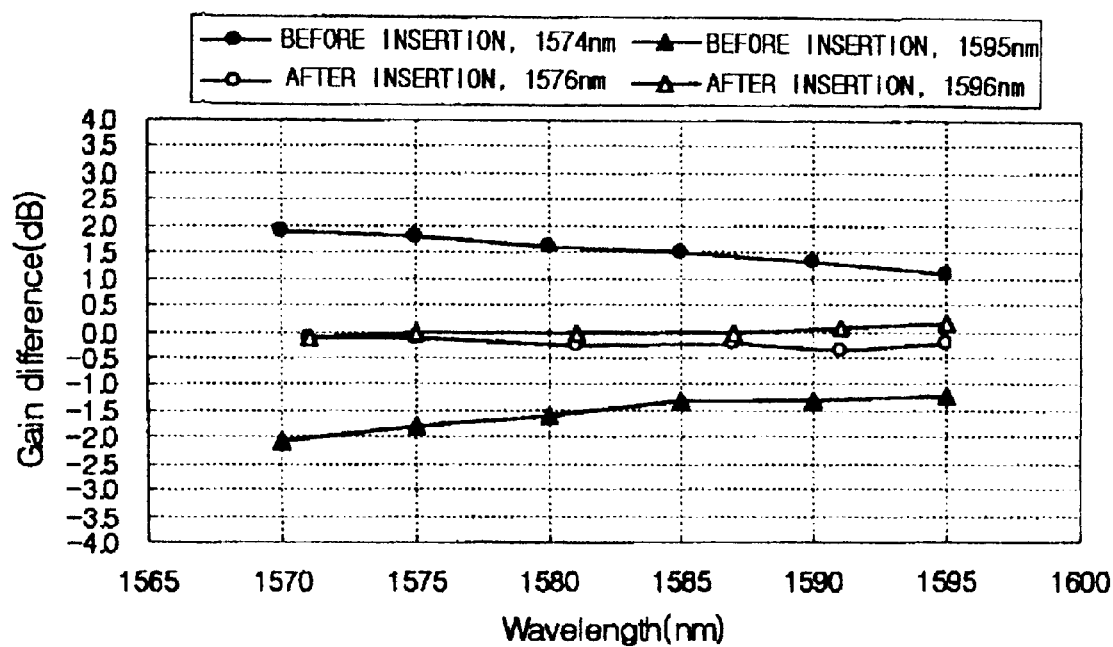
FIG. 5 is a graph showing the deviation characteristics of gain inhomogeneity in the cases where the optical isolator is inserted into the front of the second stage of FIG. 1 or not.
Figure 6:
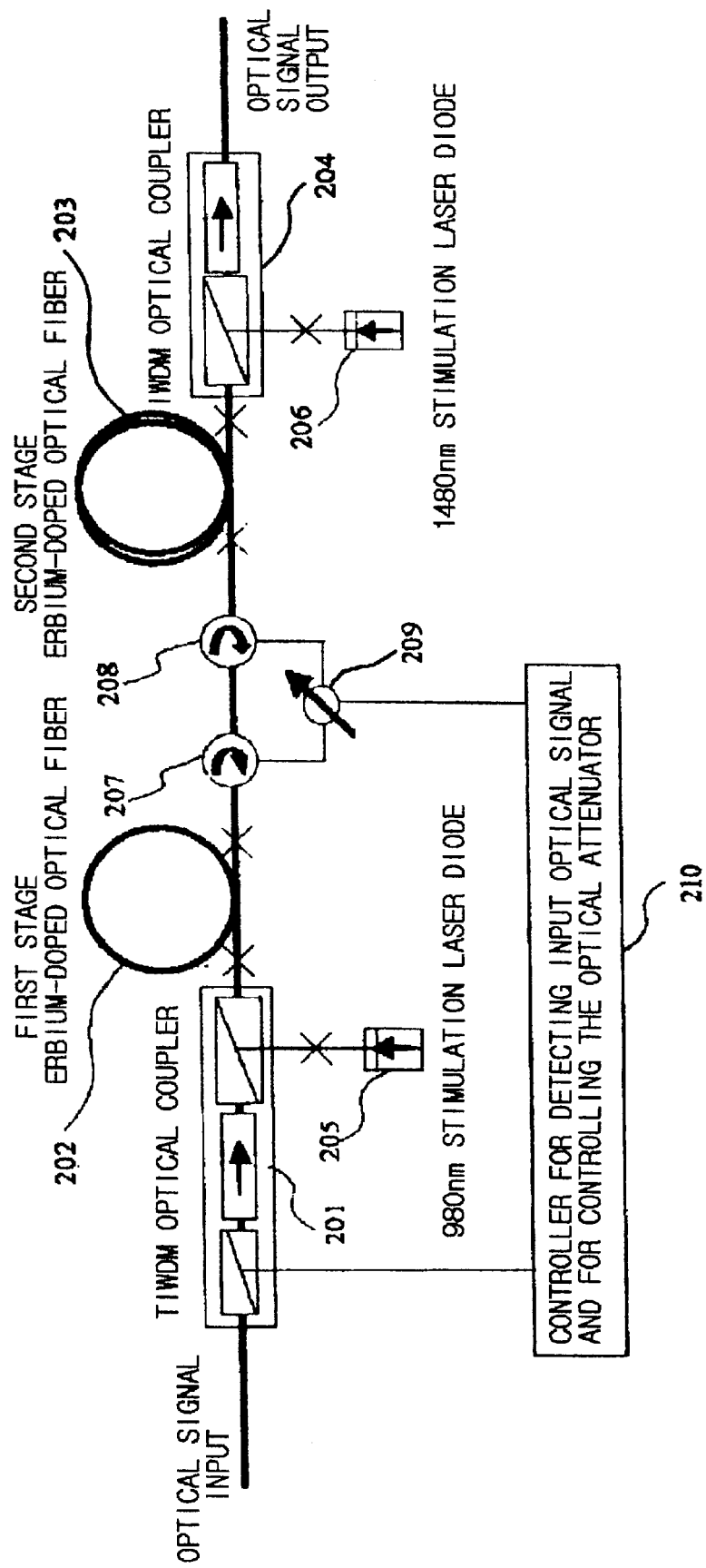
FIG. 6 is a view showing an arrangement of an erbium-doped optical fiber amplifier with a long wavelength gain band in accordance with an embodiment of the present invention.

FIG. 6 is a view showing an arrangement of the erbium-doped optical fiber amplifier with a long wavelength gain band in accordance with the embodiment.

The amplifier amplifies an input optical signal using a general two-stage erbium-doped optical fiber. That is, the input optical signal is applied to a first amplification stage erbium-doped optical fiber 202 through a TIWDM optical coupler 201 having a function of isolating light, and an output optical signal amplified at a second amplification stage erbium-doped optical fiber 203 is output through an IWDM optical coupler 204 having a function of isolating light. In the meantime, the TIWDM light coupler 201 is provided with stimulation light through a 980 nm stimulation laser diode 205, and the IWDM light coupler 204 is provided with stimulation light through a 1480 nm stimulation laser diode 206. The TIWDM light coupler 201 couples the input optical signal and the 980 nm stimulation light and applies coupled light to the first amplification stage erbium-doped optical fiber 202, and the IWDM optical coupler 204 couples optical signal outputted from the fiber and the 1480 nm stimulation light and outputs a coupled optical signal.

In addition, between the first amplification stage erbium-doped optical fiber 202 and the second amplification stage erbium-doped optical fiber 203 is positioned a control device for controlling an isolation rate of a backward amplified spontaneous light emission being propagated from the second amplification stage to the first amplification stage. The control device includes two three-port optical circulators 207 and 208 situated between the first amplification stage erbium-doped optical fiber 202 and the second amplification stage erbium-doped optical fiber 203 and serially connected to each other, and an optical attenuator 209 for connecting the other ports of the two optical circulators 207 and 208. The input optical signal amplified through the first amplification stage erbium-doped optical fiber 202 is applied to the second amplification stage erbium-doped optical fiber 203 after being passing through the first optical circulator 207 and the second optical circulator 208 successively, while the backward amplified spontaneous light emission emitted from the second amplification stage erbium-doped optical fiber 203 is sequentially passed through the second optical circulator 208, the optical attenuator 209 and the first optical circulator 207, and is somewhat attenuated at the optical attenuator 209.

The amount of attenuation at the optical attenuator 209 is determined by the controller 210, and the controller 210 detects the input optical signal and electrically controls the optical attenuator 209 according to the intensity of the optical signal inputted thereto.

Figure 7:
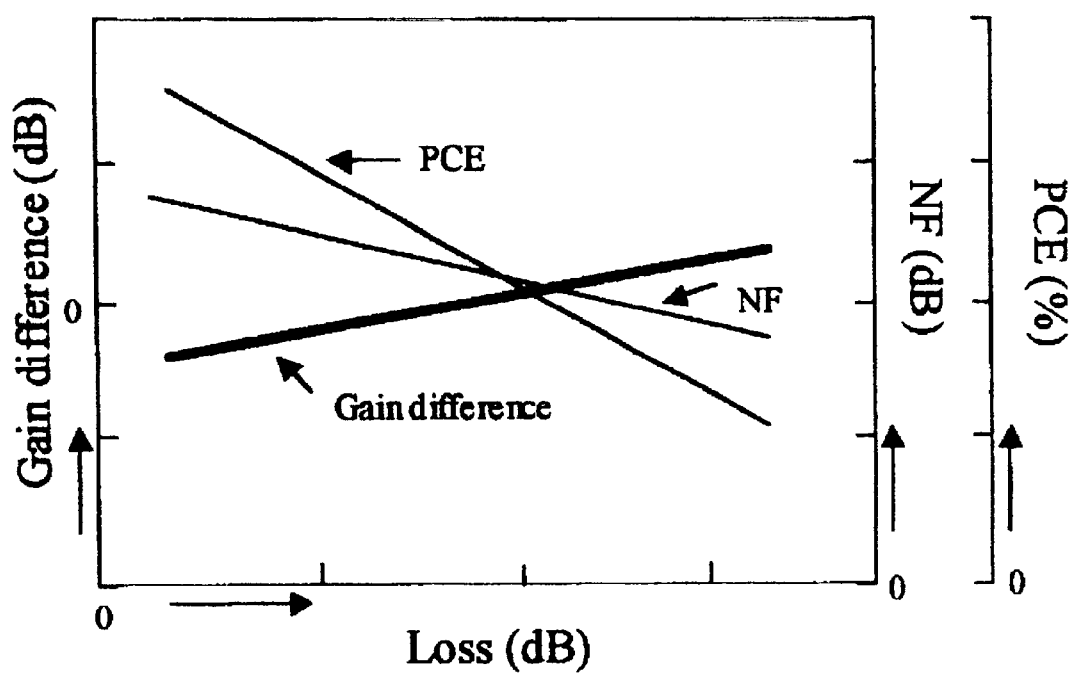
FIG. 7 is a graph showing the turning characteristics of gain spectrum, inhomogeneity and a noise figure to optimum levels at the second stage of FIG. 6.

FIG. 7 is a graph showing characteristics for tuning gain spectrum, inhomogeneity and a noise figure to optimum levels at the second stage of FIG. 6.

That is, in accordance with the present invention, a difference of gain imbalance, a noise figure and in/out power optical signal conversion efficiency are maintained at optimum levels according to input optical signal and the attenuation amount of the optical attenuator. Therefore, the high power optical amplifier with a long wavelength gain band, which includes devices for tuning the backward amplified spontaneous light emission according to the present invention, is capable of achieving low noise, high efficiency and gain homogeneity according to the intensity of input light.

As described above, in accordance with the present invention, a uniform gain spectrum can be maintained regardless of wavelengths of multi-channel optical signals, and an optical signal can be transmitted in a long wavelength band with maximized efficiency and performance under operation conditions of maximized efficiency and performance.

Although the invention has been disclosed on the basis of the preferred embodiment as above, the embodiment is not for limitative purpose but for illustrative purpose for the invention. Various modifications, additions and substitutions of the embodiment are possible to those skilled in the art, without departing from spirit of the invention. Therefore, a protection scope for the invention will be limited only by the accompanying claims, and includes all the above modifications, additions and substitutions.

What is claimed is:

1. An inhomogeneity tunable erbium-doped optical fiber amplifier which amplifies light in a long wavelength band, comprising:

an adjustable control device situated between a first amplification stage and a second amplification stage for adjustably controlling an isolation rate of a backward amplified spontaneous light emission being propagated fm a second amplification stage to the first amplification stage, thereby tuning gain inhomogeneity.

2. The inhomogeneity tunable erbium-doped optical fiber amplifier according to claim 1, wherein the control device controls a blocking rate of the backward amplified spontaneous light emission according to the intensity of an optical signal inputted to the first amplification stage.

3. The inhomogeneity tunable erbium-doped optical fiber amplifier according to claim 1 or 2, wherein the control device includes two three-port optical circulators situated between the first amplification stage and the second amplification stage and serially connected to each other, and an optical attenuator for connecting the other ports of the two optical circulators, wherein a forward propagating optical signal is propagated from the first amplification stage through the two optical circulators to the second amplification stage, and the backward amplified spontaneous light emission is propagated from the second amplification stage to the first amplification stage through one of the optical circulators, the optical attenuator and the other optical circulator, so the forward propagating optical signal is propagated without attenuation and the backward amplified spontaneous emission is attenuated by the optical attenuator.

4. The inhomogeneity tunable erbium-doped optical fiber amplifier according to claim 3, wherein the control device further includes a controller for adjusting an isolation rate of the backward amplified spontaneous emission by controlling the attenuation amount of the optical attenuator according to the intensity of the optical signal inputted into the first amplification stage.

5. The inhomogeneity tunable erbium-doped optical fiber amplifier according to claim 1 or 2, wherein the control device controls an isolation rate of the backward amplified spontaneous light emission to allow the back propagating spontaneous emission to have a 1560 to 1600 nm band of about 90% and a 1520 to 1560 nm band of about 10%.

6. The inhomogeneity tunable erbium-doped optical fiber amplifier according to claim 1 or 2, wherein a gain medium of the first amplification stage is an erbium-doped optical fiber that is effective for the 980 nm stimulation light, and a gain medium of the second amplification stage is an erbium-doped optical fiber that is effective for the 1480 nm stimulation light.

7. A method blocking a backward amplified spontaneous light emission in a two-stage inhomogeneity tunable erbium-doped optical fiber amplifier which amplifies light in a long wavelength band, in which the backward amplified spontaneous light emission being propagated from a second amplification stage to a first amplification stage is blocked, comprising adjustably controlling an isolation rate of the backward amplified spontaneous light emission according to the intensity of an optical signal inputted to the first amplification stage.

* * * * *